Feb. 4, 1958    R. L. BEYERSTEDT    2,822,098
POWER LOADERS
Filed March 18, 1955    3 Sheets-Sheet 1
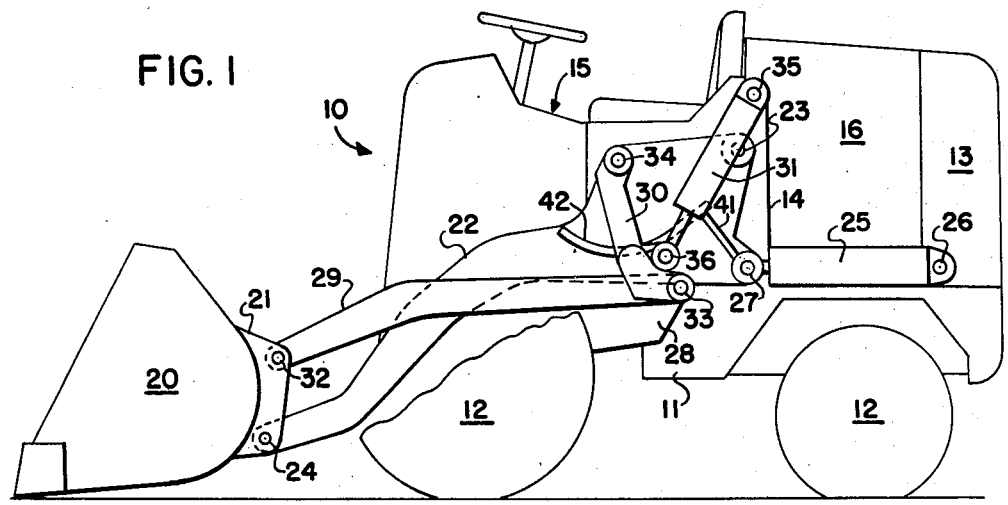
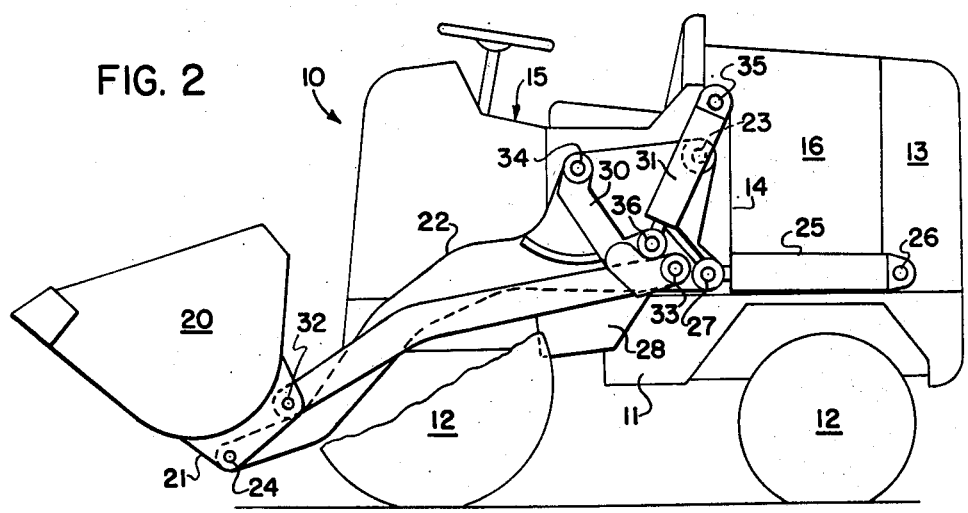
*INVENTOR.*
RALPH L. BEYERSTEDT
BY Paul O. Pippel
ATTORNEY Feb. 4, 1958   R. L. BEYERSTEDT   2,822,098
POWER LOADERS
Filed March 18, 1955   3 Sheets-Sheet 2
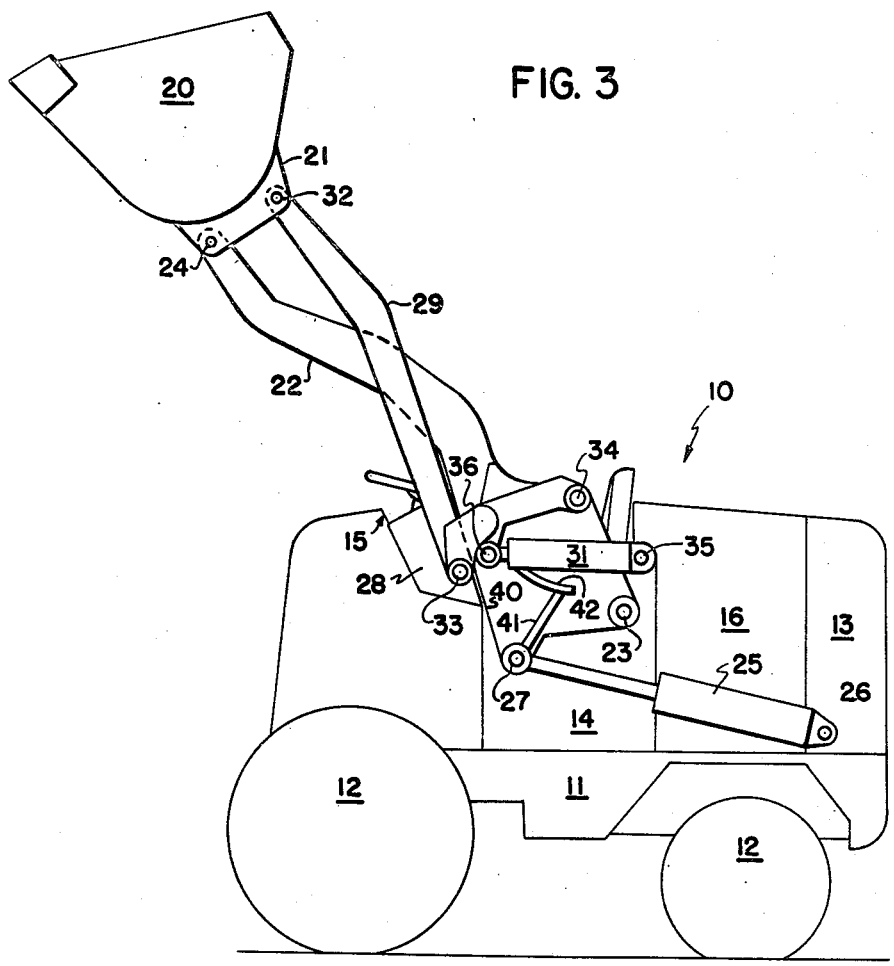
INVENTOR.
RALPH L. BEYERSTEDT
BY Paul O. Pippel
ATTORNEY

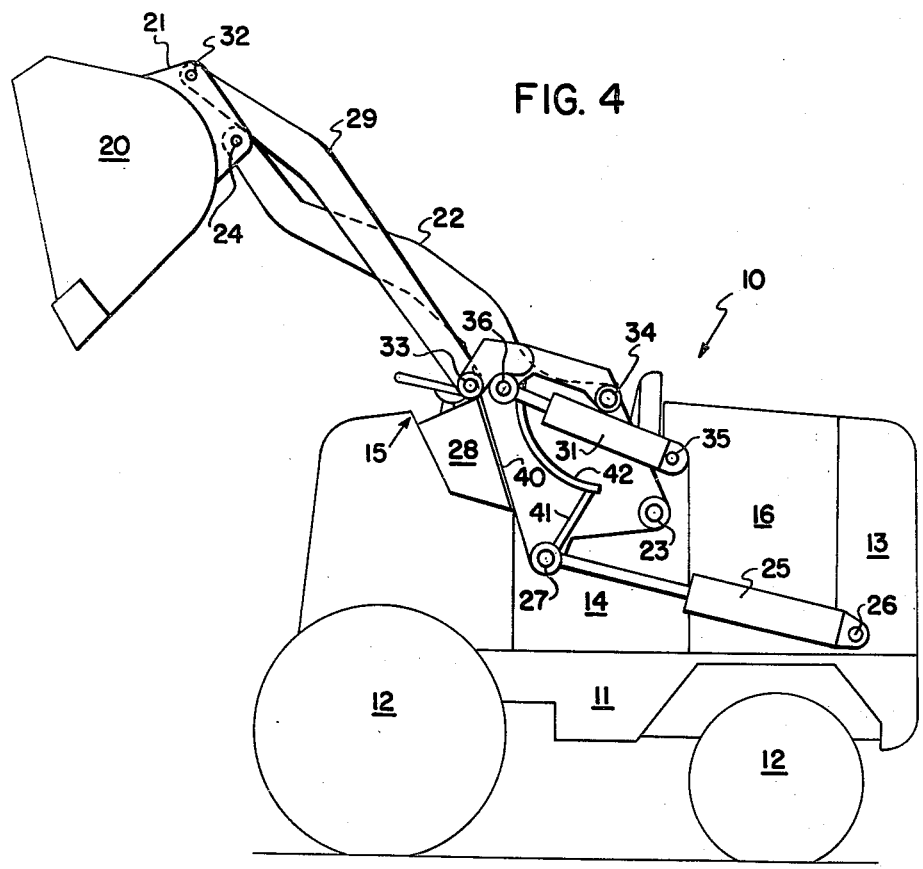

United States Patent Office 2,822,098
Patented Feb. 4, 1958

2,822,098

POWER LOADERS

Ralph L. Beyerstedt, Libertyville, Ill., assignor to The Frank G. Hough Co., a corporation of Illinois Application March 18, 1955, Serial No. 495,112

15 Claims. (Cl. 214—140)

This invention relates generally to power loaders, and more specifically to an improved arrangement for a power loader which greatly simplifies the operation of the shovel of the loader.

As is well known in the art, power loaders generally comprise a vehicle or tractor having a forwardly facing shovel mounted forwardly of the vehicle and interconnected with the vehicle by boom and link means which are under control of the vehicle or tractor operator. In operation, the bucket is first positioned by the operator to a dig position and the vehicle is then moved forwardly to force the shovel into a load. The shovel is then raised by the vehicle operator to some carry position, and from the carry position the shovel is operated by the vehicle operator to a dump position to dump the loaded shovel. The shovel is then returned to the dig position and the entire cycle is again repeated. Thus it can easily be seen that in these operations the vehicle operator must not only position the shovel at various proper elevations, but he must also tilt the shovel backwardly or forwardly, as required, for the various functions, such as digging, carrying, and dumping.

It is the object of this invention to provide a power loader wherein the operations are greatly simplified.

It is an important feature of the present invention that once the shovel has been dumped from the high-lift dump position, the vehicle operator need only lower the shovel to ground level, and the bucket will automatically tilt to the proper dig position at ground level.

Other objects and features of the present invention will be apparent upon perusal of the following specification and drawings, of which:

Figure 1 is a side plan view of a loader constructed according to the present invention with the shovel in the dig position at ground level;

Figure 2 is a side plan view of the arrangement shown in Figure 1 with the shovel in one carrying position.

Figure 3 is a side plan view of the arrangement shown in Figure 1 with the shovel in the high-lift carrying position, and Figure 4 is a side plan view of the arrangement shown in Figure 3 with the shovel in the high-lift dump position.

The present embodiment is the preferred embodiment but it is to be understood that changes can be made in the present embodiment by one skilled in the art without departing from the spirit and scope of this invention.

For a detailed description of the present invention, reference is made to the drawings. The vehicle 10 comprises a horizontally disposed frame 11 carried by the wheels 12. A rigid radiator guard 13 is mounted on the frame 11 at the rear of the vehicle. A pair of rigid plates 14 are mounted in a spaced-apart relationship on each side of the vehicle 10 substantially at the longitudinal center thereof, and are mounted on the frame 11. The pair of plates 14 provide the support for the boom and linkage means for the shovel. An operator's compartment 15 is mounted on the frame 11 and positioned forwardly of the vehicle 10. An engine compartment 16 is also mounted on the frame 11 and is disposed rearwardly of the operator's compartment 15.

The shovel 20 may be of any type of forwardly facing shovel well known in the art, having a cutting edge disposed along the forward marginal edge of the bottom plate of the shovel. The rear face of the shovel 20 is provided with a pair of spaced-apart flanges 21.

The shovel 20 is carried by a boom 22 formed in duplicate portions disposed on each side of the vehicle 10. The rear end of the boom 22 is formed as a large plate and is pivotally mounted to the plates 14 by means of pivotal mounting means 23. Pivotal mounting means 23 is disposed or positioned below the upper edge of the operator's compartment 15 and substantially at the longitudinal center of the vehicle 10, as can easily be seen in the drawings.

The forward end of each portion of the boom 22 is pivotally mounted to the pair of flanges 21 on the rear face of the shovel 20 by means of mounting means 24. The mounting means 24 are spaced substantially at the lower end of the flanges 21. To pivot the boom 22 about pivotal mounting means 23, a hydraulic ram 25 is provided in duplicate portions disposed on each side of the vehicle 10. The head end of the hydraulic ram 25 is pivotally mounted to the radiator guard 13 by means of mounting means 26. The rod end of the hydraulic ram 25 is pivotally mounted to the plate portion of the boom 22 by means of pivotal mounting means 27. Thus it can easily be seen that as the hydraulic ram 25 is extended, the boom 22 will be pivoted in a clockwise direction as viewed in the drawings to raise the shovel 20. And as the hydraulic ram 25 is retracted, the boom 22 will be pivoted in a counter-clockwise direction as viewed in the drawings to lower the shovel 20. The boom 22 is formed to have a guard 28 as a safety measure for the tractor operator when the boom is raised to a position such as shown in Figures 3 and 4.

The linkage means for the shovel 20 comprises a link 29, a lever 30 and a hydraulic ram 31, each being formed in duplicate portions disposed on each side of the vehicle 10. The forward end of the link 29 is pivotally mounted to the flanges 21 on the rear face of the shovel 20 by means of pivotal mounting means 32. The other end of the link 29 is pivotally inter-connected with one end of the lever 30 by means of pivotal mounting means 33. The other end of the lever 30 is pivotally mounted on the plate portion of the boom 22 by means of pivotal mounting means 34. Pivotal mounting means 34 is positioned forwardly of pivotal mounting means 23 and in a substantially horizontal plane with pivotal mounting means 23, when the shovel 20 is in the dig position at ground level, as can easily be seen in Figure 1. Further, when the shovel 20 is in the dig position at ground level, as shown in Figure 1, the pivotal mounting means 33 is positioned between the pivotal mounting means 34 and the pivotal mounting means 23 and substantially vertically below these latter pivotal mounting means, as can easily be seen in Figure 1. The pivotal mounting means 32 is disposed substantially vertically above pivotal mounting means 24 when the shovel 20 is in the dig position at ground level. The head end of the hydraulic ram 31 is pivotally mounted to the plates 14 by means of pivotal mounting means 35. Pivotal mounting means 35 is positioned substantially vertically above pivotal mounting means 33. The rod end of the hydraulic ram 31 is pivotally mounted to the lever 30 intermediate the ends thereof by means of pivotal mounting means 36. It must be noted that when the shovel 20 is in the dig position at ground level as shown in Figure 1, the hydraulic ram 31 is partially extended a certain amount. The plate portion of the boom 22 is formed to have ribs 40, 41 and 42 extending from the outer side thereof. The ribs 40, 41, and 42 provide rubbing surfaces for the various portions of the link means positioned thereover. A hydraulic pump, valve means, and various hydraulic fluid lines (not shown) are provided for the hydraulic rams 25 and 31, and may be of any type well known in the art.

The importance of the various details of the construction described above will be apparent upon a detailed description of the operation of the instant invention. Describing the dig position at ground level, reference is made to Figure 1 wherein it may be seen that the hydraulic ram 25 is fully retracted and the hydraulic ram 31 is partially extended a certain amount. At these operated positions of the hydraulic rams 25 and 31, the shovel 20 will assume the dig position at ground level through the described boom and linkage means.

To carry the loaded shovel 20, the hydraulic ram 31 is then completely retracted to the position shown in Figure 2 from that shown in Figure 1. The shovel 20 will then assume the carrying position shown in Figure 2 and the operator may move the vehicle 10 to a truck or bin for dumping.

Upon reaching a truck or bin, the vehicle operator causes the hydraulic ram 25 to be completely extended from the position shown in Figure 2 to that shown in Figure 3. The shovel 20 will then assume the position shown in Figure 3 preparatory to a dumping of the shovel 20.

To then dump the shovel 20, the vehicle operator causes the hydraulic ram 31 to be extended an amount exactly equal to the certain amount of extension of the hydraulic ram 31 shown in Figure 1. The shovel 20 will then assume the dump position shown in Figure 4.

Now to again return the shovel 20 to the dig position at ground level, from the position shown in Figure 4 to that shown in Figure 1, it is merely necessary for the vehicle operator to completely retract the hydraulic ram 25. Thus it can easily be seen that in going from the high-lift dump position shown in Figure 4 to the dig position at ground level shown in Figure 1, there is no necessity for any operation of the hydraulic ram 31 to adjust the degree of tilt of the shovel 20. The described boom and linkage means will cause the shovel 20 to assume the correct angle for digging at ground level.

Having described the invention what is considered new and desired to be protected by Letters Patent is:

1. In a loader having a vehicle, a shovel comprising a bottom wall and a cutting edge mounted on the forward marginal edge of said bottom wall so that when said shovel is disposed in the dig position said cutting edge and said bottom wall are positioned along a substantially horizontal line and when said shovel is disposed in the dump position said cutting edge and said bottom wall are positioned to extend substantially downwardly and forwardly an amount sufficient to permit gravity to remove any material on said bottom wall within said shovel, a boom, means pivotally mounting one end of said boom on said vehicle, means pivotally mounting the other end of said boom to said shovel, link means interconnecting said shovel, said vehicle, and said boom and operable to tilt said shovel to various positions relative to said boom, said link means formed so that in one certain operated position thereof said shovel is tilted by said link means to said dump position when said boom is fully raised, and automatically tilted by said link means to said dig position at ground level when said boom is lowered to the dig position at the ground level.

2. In a loader having a vehicle, a shovel comprising a bottom wall and a cutting edge mounted on the forward marginal edge of said bottom wall so that when said shovel is disposed in the dig position said cutting edge and said bottom wall are positioned along a substantially horizontal line and when said shovel is disposed in the dump position said cutting edge and said bottom wall are positioned to extend substantially downwardly and forwardly an amount sufficient to permit gravity to remove any material on said bottom wall within said shovel, a boom, means pivotally mounting one end of said boom on said vehicle, means pivotally mounting the other end of said boom to said shovel, means for raising and lowering said boom, link means including a hydraulic ram and pivotally interconnecting said shovel, said vehicle, and said boom, said link means operating responsive to the retraction of said hydraulic ram to tilt said shovel to a carrying position and operating responsive to the expansion of said hydraulic ram a certain amount to tilt said shovel to said dump position when said boom is raised and to tilt said shovel to said dig position at ground level when said boom is lowered to the dig position at ground level.

3. In a loader having a vehicle, a shovel comprising a bottom wall and a cutting edge mounted on the forward marginal edge of said bottom wall so that when said shovel is disposed in the dig position said cutting edge and said bottom wall are positioned along a substantially horizontal line and when said shovel is disposed in the dump position said cutting edge and said bottom wall are positioned to extend substantially downwardly and forwardly an amount sufficient to permit gravity to remove any material on said bottom wall within said shovel, a boom, means pivotally mounting one end of said boom on said vehicle, means pivotally mounting the other end of said boom to said shovel, a hydraulic ram pivotally mounted between said vehicle and said boom and operable to raise and lower said boom, link means including a second hydraulic ram and interconnecting said shovel, said vehicle, and said boom, said second hydraulic ram operable to one certain position to tilt said shovel to said dump position when said boom is raised by said first hydraulic ram, said link means formed and positioned so that said shovel is automatically tilted to said dig position at ground level when said second hydraulic ram is in said one certain position and when said first hydraulic ram is operated to lower said boom to the dig position at ground level.

4. In a loader having a vehicle, a shovel comprising a bottom wall and a cutting edge mounted on the forward marginal edge of said bottom wall so that when said shovel is disposed in the dig position said cutting edge and said bottom wall are positioned along a substantially horizontal line and when said shovel is disposed in the dump position said cutting edge and said bottom wall are positioned to extend substantially downwardly and forwardly an amount sufficient to permit gravity to remove any material on said bottom wall within said shovel, a boom, means pivotally mounting one end of said boom on said vehicle, means pivotally mounting the other end of said boom to said shovel, a link, a lever, a hydraulic ram, means pivotally mounting one end of said link to said shovel, means pivotally interconnecting the other end of said link and one end of said lever, means pivotally mounting the other end of said lever on said boom, means pivotally mounting one end of said hydraulic ram on said vehicle, means pivotally mounting the other end of said hydraulic ram to said lever intermediate the ends thereof, said means for pivoting said link, said lever, and said hydraulic ram, positioned so that said hydraulic ram is operable to one certain position to tilt said shovel to said dump position when said boom is raised and so that said shovel is automatically tilted to said dig position at ground level when said hydraulic ram is operated to said one certain position and when said boom is lowered to the dig position at ground level.

5. In a loader having a vehicle, a shovel, a boom, means pivotally mounting one end of said boom on said vehicle, means pivotally mounting the other end of said boom to said shovel substantially at the lower marginal edge of the rear face thereof, a hydraulic ram pivotally mounted at one end thereof on said vehicle, means pivotally mounting the other end of said hydraulic ram to said boom intermediate the ends thereof for raising and lowering said boom, a link, a lever, a second hydraulic ram, means pivotally mounting one end of said link to said shovel substantially vertically above the pivotal mounting means of said boom to said shovel when said shovel is in the dig position at ground level, means pivotally interconnecting the other end of said link and one end of said lever, means pivotally mounting the other end of said lever on said boom intermediate the ends thereof, means pivotally mounting one end of said second hydraulic ram on said vehicle, means pivotally mounting the other end of said second hydraulic ram to said lever intermediate the ends thereof, the pivotal mounting means of said link positioned so that a plane therethrough intersects a plane through the pivotal mounting means for said boom between said pivotal mounting means, the pivotal mounting means for said second hydraulic ram and said lever positioned relative to the pivotal mounting means of said boom and said link so that said second hydraulic ram is operable to one certain position to tilt said shovel to the dump position when said first hydraulic ram is operated to raise said boom and so that said shovel is automatically tilted to the dig position at ground level without any operation of said second hydraulic ram when said boom is lowered from the dump position to the dig position at ground level by said first hydraulic ram.

6. In a loader, a vehicle having a shovel pivotally supported on said vehicle through a boom, said shovel comprising a bottom wall and a cutting edge mounted on the forward marginal edge of said bottom wall so that when said shovel is disposed in the dig position said cutting edge and said bottom wall are positioned along a substantially horizontal line and when said shovel is disposed in the dump position said cutting edge and said bottom wall are positioned to extend substantially downwardly and forwardly an amount sufficient to permit gravity to remove any material on said bottom wall within said shovel, adjustable link means operating responsive to the adjustment thereof a certain amount to tilt said shovel to said dump position when said boom is raised and to automatically tilt said shovel to said dig position at ground level when said boom is lowered to the dig position at ground level.

7. In a loader, a vehicle having a shovel pivotally supported on said vehicle through a boom, said shovel comprising a bottom wall and a cutting edge mounted on the forward marginal edge of said bottom wall so that when said shovel is disposed in the dig position said cutting edge and said bottom wall are positioned along a substantially horizontal line and when said shovel is disposed in the dump position said cutting edge and said bottom wall are positioned to extend substantially downwardly and forwardly an amount sufficient to permit gravity to remove any material on said bottom wall within said shovel, link means including a hydraulic ram and operating responsive to the extension of said hydraulic ram a certain amount to tilt said shovel to said dump position when said boom is raised and to tilt said shovel to said dig position at ground level when said boom is lowered to the dig position at ground level.

8. In a loader having a vehicle, a shovel, a boom, one end of said boom being formed as a plate portion, means pivotally mounting said plate portion of said boom on said vehicle, means pivotally mounting the other end of said boom to said shovel, a link, a lever, a hydraulic ram, means pivotally mounting one end of said link to said shovel substantially vertically above the pivotal connection of said boom to said shovel when said shovel is in the dig position at ground level, means pivotally interconnecting the other end of said link to one end of said lever, means pivotally mounting the other end of said lever on said plate portion of said boom, the mounting means for said boom on said vehicle and said lever on said plate portion of said boom being positioned in a substantially horizontal plane in a spaced-apart relationship to each other when said boom is lowered to the dig position at ground level, means pivotally mounting one end of said hydraulic ram on said vehicle substantially vertically above the pivotal mounting means for said boom on said vehicle, means pivotally mounting the other end of said hydraulic ram to said lever intermediate the ends thereof, the pivotal mounting means of said hydraulic ram to said lever and the pivotal mounting means of said lever to said link being positioned between and substantially vertically below the pivotal mounting means for said lever to said boom and said boom to said vehicle when said boom is in the dig position at ground level.

9. In a loader having a vehicle, a shovel pivotally supported on said vehicle through a boom, said shovel comprising a bottom wall and a cutting edge mounted on the forward marginal edge of said bottom wall so that when said shovel is disposed in the dig position said cutting edge and said bottom wall are positioned along a substantially horizontal line and when said shovel is disposed in the dump position said cutting edge and said bottom wall are positioned to extend substantially downwardly and forwardly an amount sufficient to permit gravity to remove any material on said bottom wall within said shovel, a link, a hydraulic ram, a lever pivotally interconnecting said link and said hydraulic ram, means pivotally connecting said link to said shovel, means pivotally connecting said lever to said boom, means pivotally connecting said hydraulic ram to said vehicle, said first, second and third means relatively positioned so that for a certain predetermined amount of operation of said hydraulic ram said shovel is tilted to said dump position when said boom is fully raised and automatically tilted to said dig position at ground level when said boom is lowered to the dig position at ground level.

10. In a loader having a vehicle, a shovel pivotally supported on said vehicle through a boom, said shovel comprising a bottom wall and a cutting edge mounted on the forward marginal edge of said bottom wall so that when said shovel is disposed in the dig position said cutting edge and said bottom wall are positioned along a substantially horizontal line and when said shovel is disposed in the dump position said cutting edge and said bottom wall are positioned to extend substantially downwardly and forwardly an amount sufficient to permit gravity to remove any material on said bottom wall within said shovel, a link, a hydraulic ram, a lever, means pivotally connecting one end of said lever and one end of said link, means pivotally connecting one end of said hydraulic ram and said lever intermediate the ends thereof, means pivotally connecting the other end of said link and said shovel, means pivotally connecting the other end of said lever and said boom, means pivotally connecting the other end of said hydraulic ram and said vehicle, said first, second, third, fourth and fifth means relatively positioned so that said shovel is tilted to said dump position when said boom is raised and automatically tilted to said dig position at ground level when said boom is lowered to the dig position at ground level for a certain predetermined amount of operation of said hydraulic ram.

11. In a loader having a vehicle, a shovel, a boom formed in duplicate portions disposed on each side of said vehicle, means pivotally mounting one end of each duplicate portion of said boom on said vehicle, means pivotally mounting the other end of each duplicate portion of said boom to said shovel substantially at the lower marginal edges of the rear face thereof, a pair of hydraulic rams pivotally mounted at one end thereof on each side of said vehicle, means pivotally mounting the other end of each of said pair of hydraulic rams to one duplicate portion of said boom intermediate the ends thereof for raising and lowering said boom, a pair of links, a pair of levers, a pair of second hydraulic rams, means pivotally mounting one end of each of said pair of links to said shovel substantially vertically above the pivotal mounting means of said boom to said shovel when said shovel is in the dig position at ground level, means pivotally interconnecting the other end of each of said pair of links and one end of each of said pair of levers, means pivotally mounting the other end of each of said levers on one of said duplicate portions of said boom intermediate the ends thereof, means pivotally mounting one end of each of said second hydraulic rams on said vehicle on each side thereof, means pivotally mounting the other end of each of said second hydraulic rams to said levers intermediate the ends thereof and adjacent to the means pivotally interconnecting said levers and said links, the pivotal mounting means of said links being positioned so that a plane therethrough intersects a plane through the pivotal mounting means for said boom between said pivotal mounting means.

12. In a loader having a vehicle having an operator's compartment disposed substantially in the forward portion of said vehicle, a shovel, a boom, one end of said boom being formed as a widened plate portion, means pivotally mounting the end of said widened plate portion of said boom on said vehicle at a point adjacent the rearward end of said operator's compartment, said boom extending forwardly of said vehicle and means pivotally mounting the forward end of said boom to said shovel, a link, a lever, a hydraulic ram, means pivotally mounting one end of said link to said shovel substantially vertically above the pivotal connection of said boom to said shovel when said shovel is in the horizontal dig position at ground level, means pivotally interconnecting the other end of said link to one end of said lever, means pivotally mounting the other end of said lever on said widened plate portion of said boom adjacent the upper marginal edge of said widened plate portion, the pivotal mounting means for said lever on said widened plate portion of said boom being spaced substantially horizontally forwardly of the pivotal mounting means for said boom on said vehicle when said boom is lowered to the dig position at ground level, means pivotally mounting one end of said hydraulic ram on said vehicle substantially vertically above the pivotal mounting means for said boom on said vehicle, means pivotally mounting the other end of said hydraulic ram to said lever intermediate the ends thereof and adjacent to the means pivotally interconnecting said link and said lever, the pivotal mounting means of said lever to said link being positioned between and substantially vertically below the pivotal mounting means for said lever on said boom and said boom on said vehicle when said boom is in the dig position at ground level.

13. In a loader as claimed in claim 12, a second hydraulic ram for raising and lowering said boom, means pivotally connecting one end of said second hydraulic ram to said widened plate portion of said boom at the lower marginal edge thereof opposite from the pivotal mounting means for said lever on said boom, and means pivotally mounting the other end of said second hydraulic ram on said vehicle at a position whereby said second hydraulic ram is disposed in a substantially horizontal plane when said boom is in the dig position at ground level.

14. In a loader having a vehicle having an operator's compartment disposed substantially in the forward portion of said vehicle, a shovel, a boom formed in duplicate portions disposed on each side of said vehicle, one end of each of said duplicate portions of said boom being formed as a widened plate portion, means pivotally mounting the end of each of said widened plate portions on each side of said vehicle at a point adjacent the rearward end of said operator's compartment, said boom extending forwardly of said vehicle and means pivotally mounting the forward end of each of said duplicate portions of said boom to said shovel at the lower marginal edges of the rear face thereof, a pair of links, a pair of levers, a pair of hydraulic rams, means pivotally mounting one end of each of said pair of links to said shovel substantially vertically above the pivotal connections of said boom to said shovel when said shovel is in the horizontal dig position at ground level, means pivotally interconnecting the other ends of each of said pair of links and one end of each of said pair of levers, means pivotally mounting the other end of each of said levers on each of said widened plate portions of said boom adjacent the upper marginal edge of said widened plate portion, the pivotal mounting means for each of said levers on said widened plate portions of said boom being spaced substantially horizontally forwardly of the pivotal mounting means for said boom on said vehicle when said boom is lowered to the dig position at ground level, means pivotally mounting one end of each of said pair of hydraulic rams on each side of said vehicle substantially vertically above the pivotal mounting means for said boom on said vehicle, means pivotally mounting the other end of each of said pair of hydraulic rams to said levers intermediate the ends thereof and adjacent to the means pivotally interconnecting said links and said levers, the pivotal mounting means of said levers to said links being positioned between and substantially vertically below the pivotal mounting means for said levers on said boom and said boom on said vehicle when said boom is in the dig position at ground level.

15. In a loader as claimed in claim 14, a second pair of hydraulic rams for raising and lowering said boom, means pivotally connecting one end of each of said second hydraulic rams to said widened plate portions of said boom at the lower marginal edges thereof opposite from the pivotal mounting means for said levers on said boom, and means pivotally mounting the other end of each of said second hydraulic rams on each side of said vehicle at a position whereby said second hydraulic rams are disposed in a substantially horizontal plane when said boom is in the dig position at the ground level.

References Cited in the file of this patent

UNITED STATES PATENTS

| | | |
|---|---|---|
| 2,437,808 | Drettmann | Mar. 16, 1948 |
| 2,482,612 | Drott et al. | Sept. 20, 1949 |
| 2,710,699 | Dorkins | June 14, 1955 |

FOREIGN PATENTS

| | | |
|---|---|---|
| 1,068,273 | France | Feb. 3, 1954 |